United States Patent [19]
Arai et al.

[11] Patent Number: 5,459,541
[45] Date of Patent: Oct. 17, 1995

[54] CAMERA HAVING A PICTURE IMAGE AREA AND FIELD OF VIEW VARYING MECHANISM

[75] Inventors: Akihiro Arai; Kiyoshi Kawano; Yoshinori Ono, all of Tokyo, Japan

[73] Assignee: Asahi Kogaku Kogyo Kabushiki Kaisha, Tokyo, Japan

[21] Appl. No.: 208,826

[22] Filed: Mar. 11, 1994

[30] Foreign Application Priority Data

Mar. 15, 1993 [JP] Japan ................. 5-011161 U

[51] Int. Cl.⁶ ........................... G03B 17/02; G03B 37/00
[52] U.S. Cl. .................................. 354/159; 354/94
[58] Field of Search .................... 354/94, 159; 74/54

[56] References Cited

U.S. PATENT DOCUMENTS

| | | | |
|---|---|---|---|
| 4,987,436 | 1/1991 | Misawa | 354/159 |
| 5,010,357 | 4/1991 | Misawa | 354/159 |
| 5,066,971 | 11/1991 | Kodaira | 354/465 |
| 5,086,311 | 2/1992 | Naka et al. | 354/195.1 |
| 5,142,315 | 8/1992 | Haraguchi | 354/159 |
| 5,258,790 | 11/1993 | Tanaka | 354/94 |
| 5,294,951 | 3/1994 | Lo | 354/111 |
| 5,298,929 | 3/1994 | Tsunefuji et al. | 354/159 |
| 5,305,051 | 4/1994 | Irie et al. | 354/159 |
| 5,323,196 | 6/1994 | Labaziewicz | 354/94 |
| 5,327,183 | 7/1994 | Kurei | 354/129 |
| 5,345,285 | 9/1994 | Hasushita et al. | 354/159 |

*Primary Examiner*—Michael L. Gellner
*Assistant Examiner*—Nicholas L. Tuccillo
*Attorney, Agent, or Firm*—Sandler, Greenblum & Bernstein

[57] ABSTRACT

A camera having a mechanism for varying a picture image includes, an aperture frame which defines an aperture corresponding to the image area, and a pair of light intercepting plates which are rotatably supported by respective shafts on opposite sides of the aperture. The pair of light intercepting plates move between an operative position, in which the light intercepting plates partly cover the aperture, and a retracted position, in which the light intercepting plates are retracted from the aperture. The operative position corresponds to a small image area, and the retracted position corresponds to a large image area. The camera further includes an associating rod member, which is provided in the vicinity of one end of the shafts of the light intercepting plates and movable in a direction substantially perpendicular to the shafts, and an actuating member, which rotates the light intercepting plates in association with the movement of the rod member.

17 Claims, 14 Drawing Sheets

CAMERA HAVING A PICTURE IMAGE AREA AND FIELD OF VIEW VARYING MECHANISM

BACKGROUND OF THE INVENTION

1. Field of the Invention

The present invention relates to a camera having an apparatus which varies the size of a picture image area.

2. Description of Related Art

Recently, cameras have been developed which include a variable image area in which the size of the image area is varied between at least two sizes (e.g. 35 mm standard size and panoramic size) by a light intercepting plate. The light intercepting plate is retractably inserted into a photographing optical path to restrict the image area. This operation can be carried out even while a film is loaded. However, the known image area varying mechanism is complex and requires a large space for accommodation. This makes it difficult to incorporate the image area size varying mechanism in a small camera, and prevents the realization of a compact camera.

There is a known view finder of a camera in which the size of the field of view is varied in accordance with the variation in image area size. The known field size varying mechanism is also complex and requires a large space for accommodation, preventing the realization of a compact camera.

SUMMARY OF THE INVENTION

The primary object of the present invention is to provide a camera having a simple image area size varying mechanism and/or a simple field size varying mechanism that minimizes the size of an associated camera.

To achieve the object mentioned above, according to the present invention, there is provided a camera having a mechanism for varying a picture image area. The camera includes, an aperture frame which defines an aperture corresponding to the image area, a pair of light intercepting plates which are rotatably supported by respective shafts on opposite sides of the aperture and which move between an operative position, in which the light intercepting plates partly cover the aperture, and a retracted position, in which the light intercepting plates are retracted from the aperture. The operative position corresponds to a small image area, and the retracted position corresponds to a large image area. The camera further includes an associating rod member which is provided in the vicinity of one end of the shafts of the light intercepting plates and which moves in a direction substantially perpendicular to the shafts, and an actuating member which rotates the light intercepting plates in association with a movement of the rod member.

At least one cam pin is provided on each of the light intercepting plates to project towards the rod member. A pair of cam portions are provided on the rod member to engage with corresponding cam pins of the light intercepting plates. The cam portions have different shapes and are associated with the movement of the rod member in a manner such that the light intercepting plates are rotated between the operative position and the retracted position by the cam portions.

It is possible to provide elastic biasing members that continuously bias the light intercepting plates towards the retracted position.

In an embodiment, one of the light intercepting plates includes one cam pin and the other light intercepting plate includes first and second cam pins, wherein one of the cam portions of the rod member has a continuous single cam surface with which the one cam pin of one of the light intercepting plates engages, and the other cam portion has two separate cam surfaces with which the two cam pins of the other light intercepting plate respectively engage at different angular positions of the light intercepting plate.

Preferably, one cam surface is a convex cam surface and the other is a concave cam surface.

When the light intercepting plates are moved from the retracted position to the operative position, the first cam pin engages with the convex cam surface and rotates to move the light intercepting plates towards the operative position while the second pin is initially disengaged from the concave cam surface. When the light intercepting plates are rotated through a predetermined angle, the first cam pin is disengaged from the convex cam surface and the second cam pin engages with the concave cam surface until the light intercepting plates are rotated into the operative position.

When the light intercepting plates are in the operative position, the concave cam surface engages with the second cam pin to hold the light intercepting plates in the operative position against the elastic biasing members.

When the light intercepting plates are moved from the operative position to the retracted position, the second cam pin rotates to move the light intercepting plates towards the retracted position while engaging with the concave cam surface through the force of the elastic biasing members. When the light intercepting plates are rotated through a predetermined angle, the second cam pin disengages from the concave cam surface and the first cam pin engages with the convex cam surface until the light intercepting plates are completely rotated into the retracted position.

Preferably, one cam pin is continuously in contact with a cam surface of the rod member that extends in a direction substantially perpendicular to the movement of the rod member.

Provision is also made for an operating member to be arranged on an external portion of the camera body and to be slidable to vary the size of the picture image area, and an associating mechanism for moving the rod member in association with the sliding movement of the operating member.

According to another aspect of the present invention, a camera having a mechanism for varying a picture image area is provided which includes an aperture frame for defining a generally rectangular aperture corresponding to the image area, a pair of pivot shafts which are provided on opposite parallel sides of the aperture outside the aperture, a pair of light intercepting plates which are rotatably supported by the pivot shafts and movable between a small image area position in which the light intercepting plates partly cover the aperture and a large image area position in which the light intercepting plates are retracted from the aperture, an image area size varying rod which is provided on one side of the aperture outside of the aperture so as to move in a direction substantially perpendicular to the axes of the pivot shafts, at least one cam pin being provided on each of the light intercepting plates that project towards the image area varying rod, and a pair of cam portions having different shapes which are provided on the image area size varying rod to engage with the respective cam pins of the light intercepting plates and which rotate the light intercepting plates about the respective pivot shafts in association with the linear movement of the image area varying rod to thereby move the light intercepting plates between the small image area position and the large image area position.

According to still another aspect of the present invention, a view finder of a camera having a mechanism for varying a picture image area is provided. The view finder includes a pair of rotors which are provided on the outside of a generally rectangular field of view and which have rotating shafts which are substantially parallel to opposite parallel sides of the field of view, a rotating mechanism which rotates the rotors in an associative manner, and light intercepting plates which are provided on the rotors and which are movable between a small field size position, in which the light intercepting plates partly cover the field of view, and a large field size position, in which the light intercepting plates are retracted from the field of view.

According to still another aspect of the present invention, a view finder of a camera having a mechanism for varying a picture image area is provided. The view finder includes a pair of rotors which are rotatable about respective axes that are parallel to opposite sides of a generally rectangular field of view of the finder. The view finder further includes, a rotating mechanism which rotates the rotors in an associative manner, light intercepting plates which are integrally provided on the rotors and which are movable between a small field size position in which the light intercepting plates partly cover the field of view and a large field size position in which the light intercepting plates are retracted from the field of view, in accordance with the rotation of the rotors, and a driving mechanism for rotating one of the rotors.

The present disclosure relates to subject matter contained in Japanese utility model application No. HEI 5-11161 (filed on Mar. 15, 1993) which is expressly incorporated herein by reference in its entirety.

BRIEF DESCRIPTION OF THE DRAWINGS

The invention will be described below in detail with reference to the accompanying drawings, in which.

DESCRIPTION OF THE PREFERRED EMBODIMENT

Figure 14:
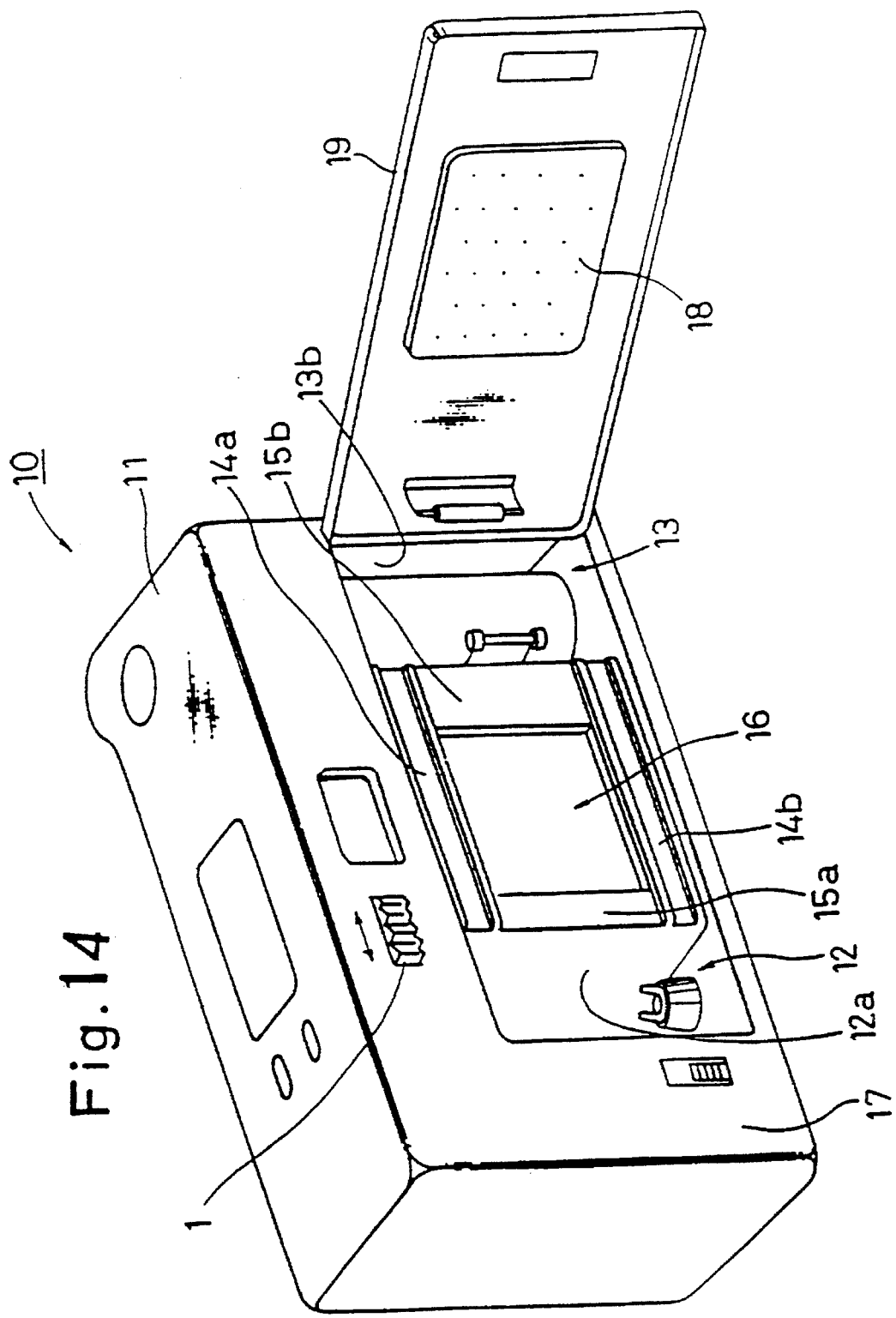
FIG. 14 is a perspective view of a camera having a image area size varying mechanism according to the present invention.

With reference to FIG. 14, a camera 10, having an image area size varying mechanism according to the present invention, includes a camera body 11 having a patrone compartment 12, a spool compartment 13, and an aperture 16. The aperture 16 is defined by a pair of upper and lower aperture frames 14a and 14b and a pair of right and left aperture frames 15a and 15b. The aperture frames 14a, 14b, 15a and 15b are located between the patrone compartment 12 and the spool compartment 13 and define a photographing image area. The camera body 11 is provided on the rear wall 17 thereof with the back cover 19. The back cover 19 covers the patrone compartment 12, the spool compartment 13, and the aperture 16, etc. when closed. A film keeping plate 18 is provided on the back cover 19.

FIGS. 1 through 8 show an image area size varying mechanism 20 incorporated in the camera 10, according to the present invention.

Figure 5:
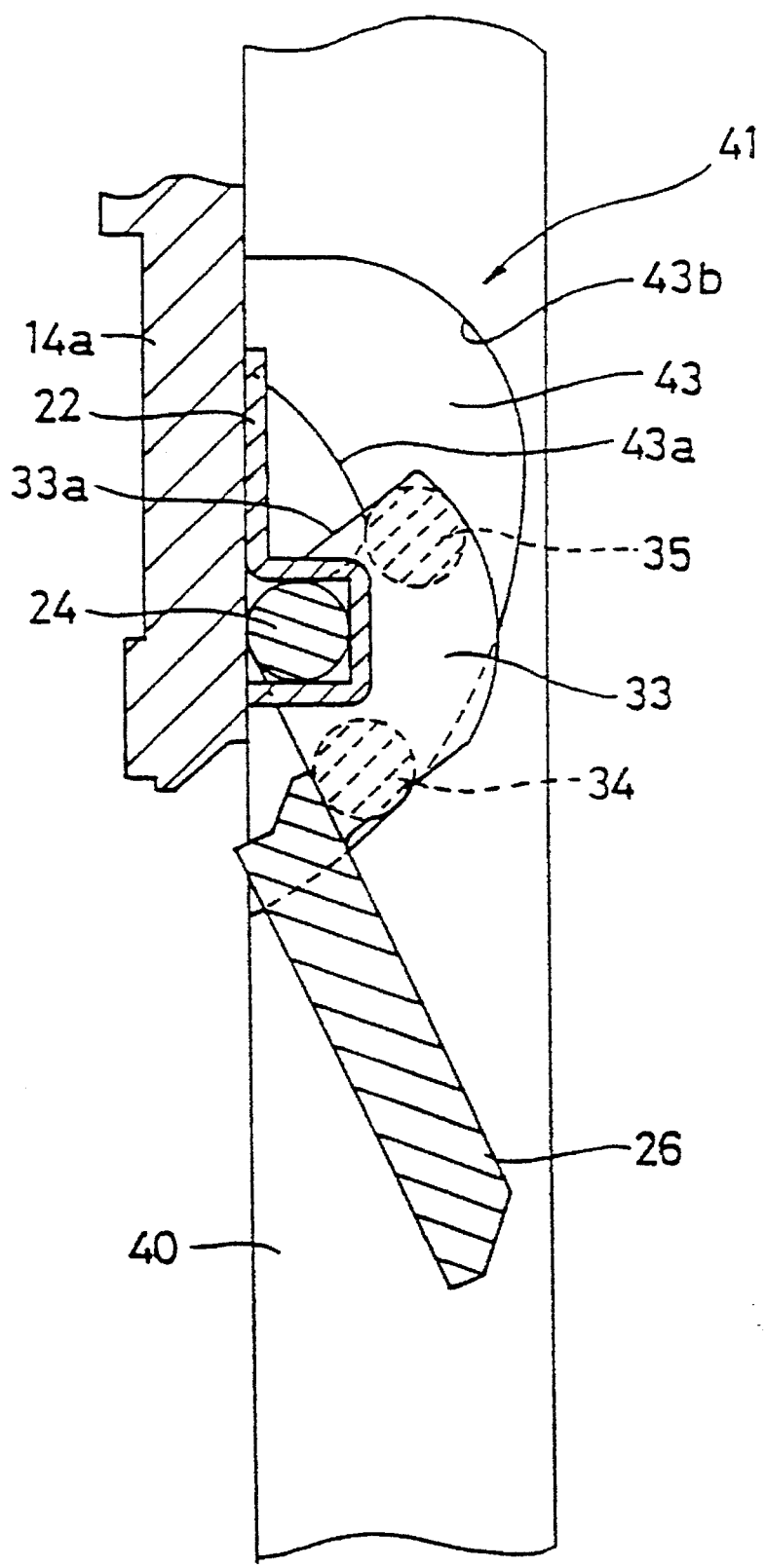
FIG. 5 is an enlarged partial view of FIG. 2.
Figure 6:
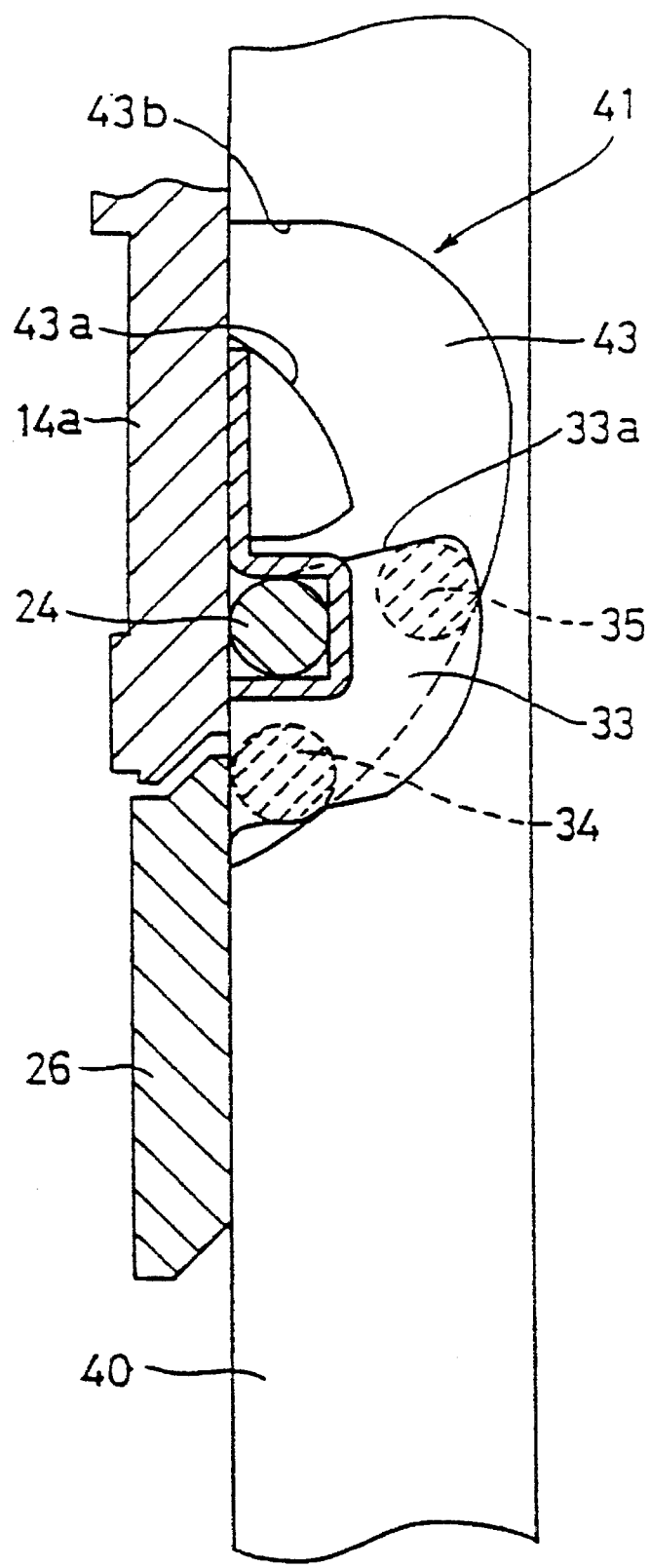
FIG. 6 is an enlarged partial view of FIG. 3.
Figure 7:
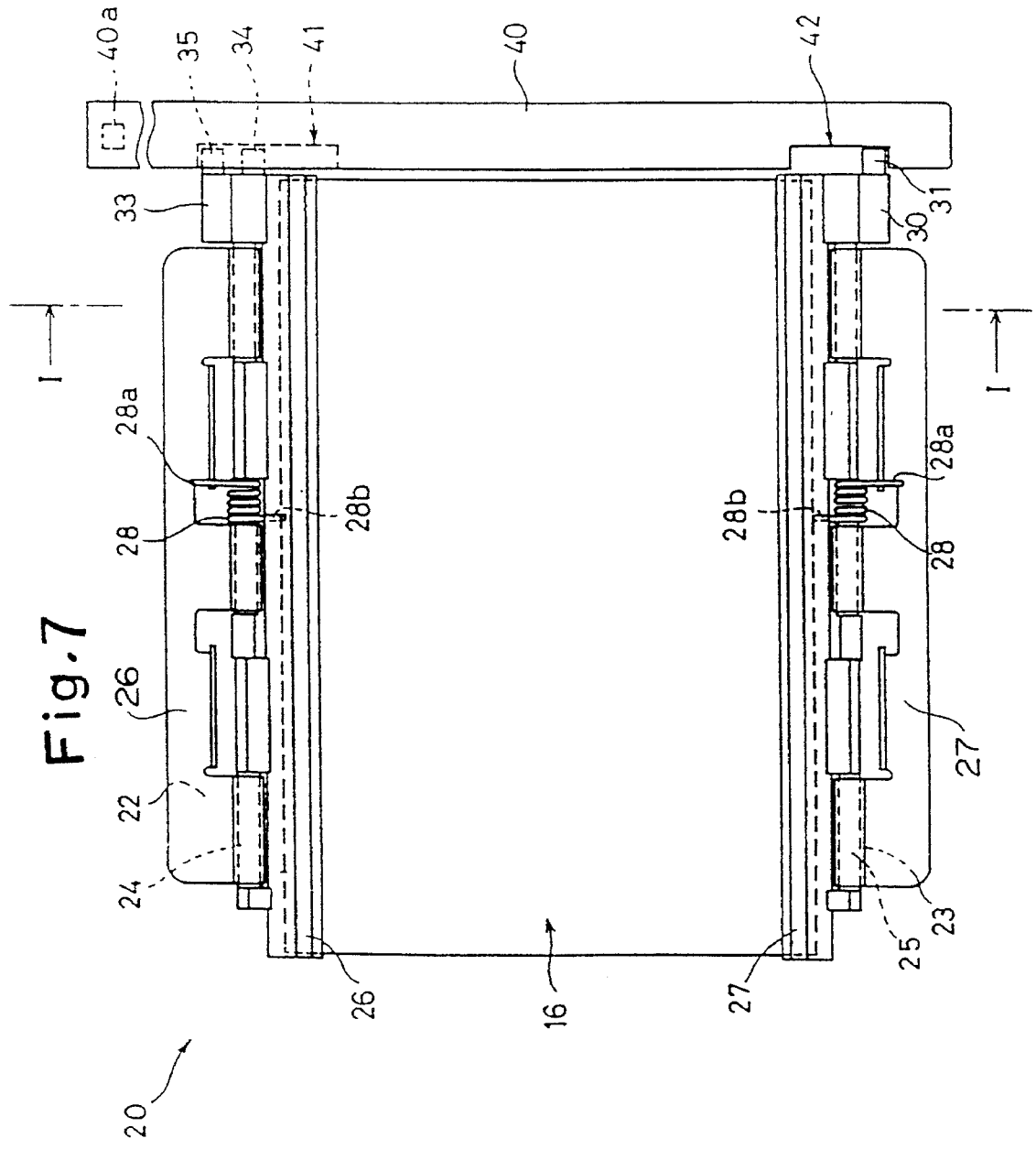
FIG. 7 is a front elevational view of an image area size varying mechanism shown in FIG. 1.
Figure 8:
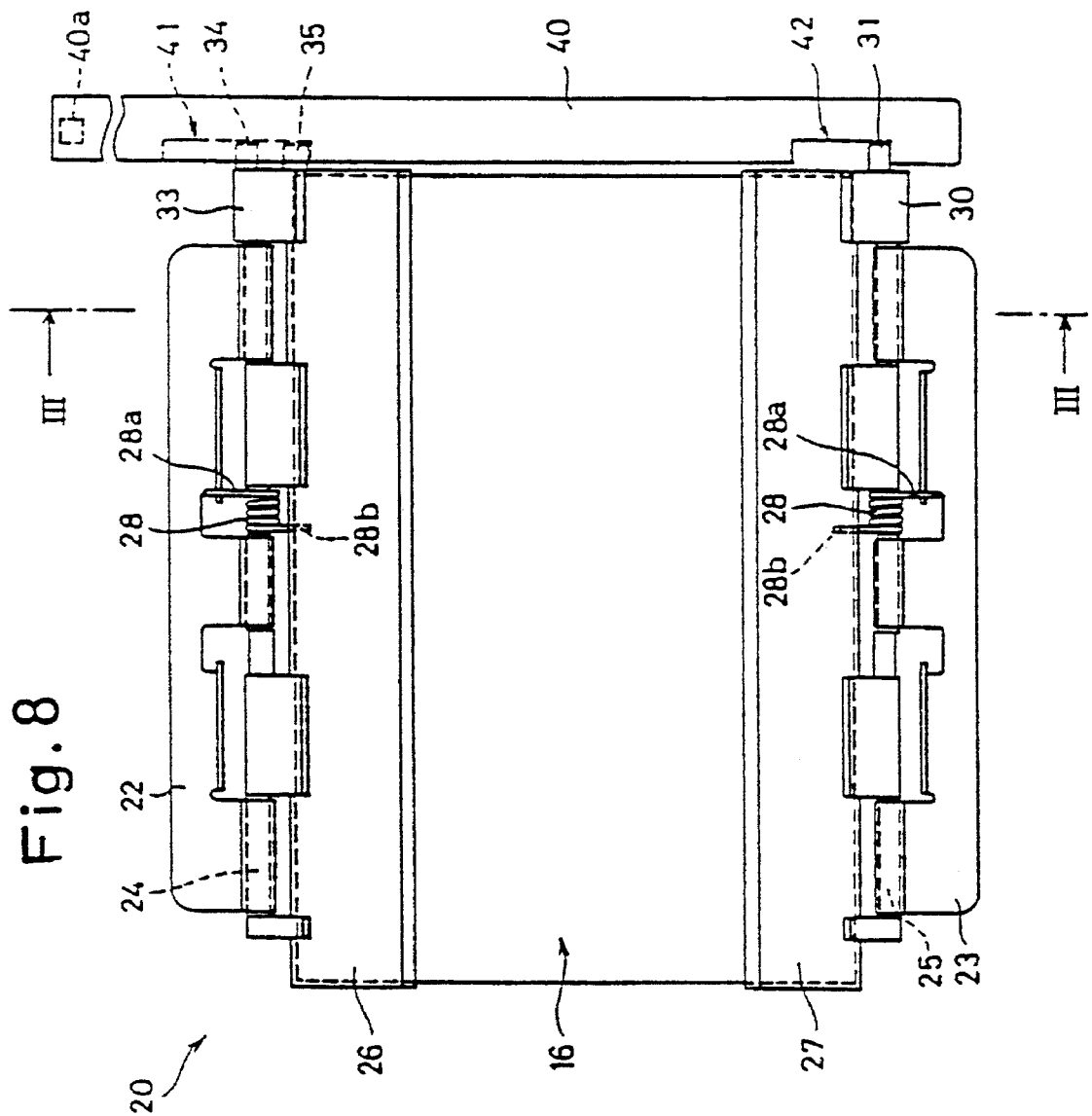
FIG. 8 is a front elevational view of an image area size varying mechanism shown in FIG. 3.

In FIGS. 1 through 6, the left and right sides of the figures correspond to the film side and the object side of the mechanism 20, respectively. In FIGS. 7 and 8, the front and back sides of the surface of the drawings correspond to the object side and the film side of the mechanism 20, respectively.

The image area size varying mechanism 20 is secured to the front side (i.e., object side) of the aperture frames 14a, 14b, 15a and 15b which define the image area. Bearing members 22 and 23 are secured to the front surfaces of the upper and lower aperture frames 14a and 14b of the aperture 16 in order to support shafts (i.e., rotating shafts) 24 and 25. First and second light intercepting plates 26 and 27 are rotatably supported by the respective shafts 24 and 25. Plates 26 and 27 can be moved into the aperture 16 to redefine the upper and lower edges of the aperture 16 in a manner such that a predetermined width of the aperture 16 is reduced.

Figure 1:
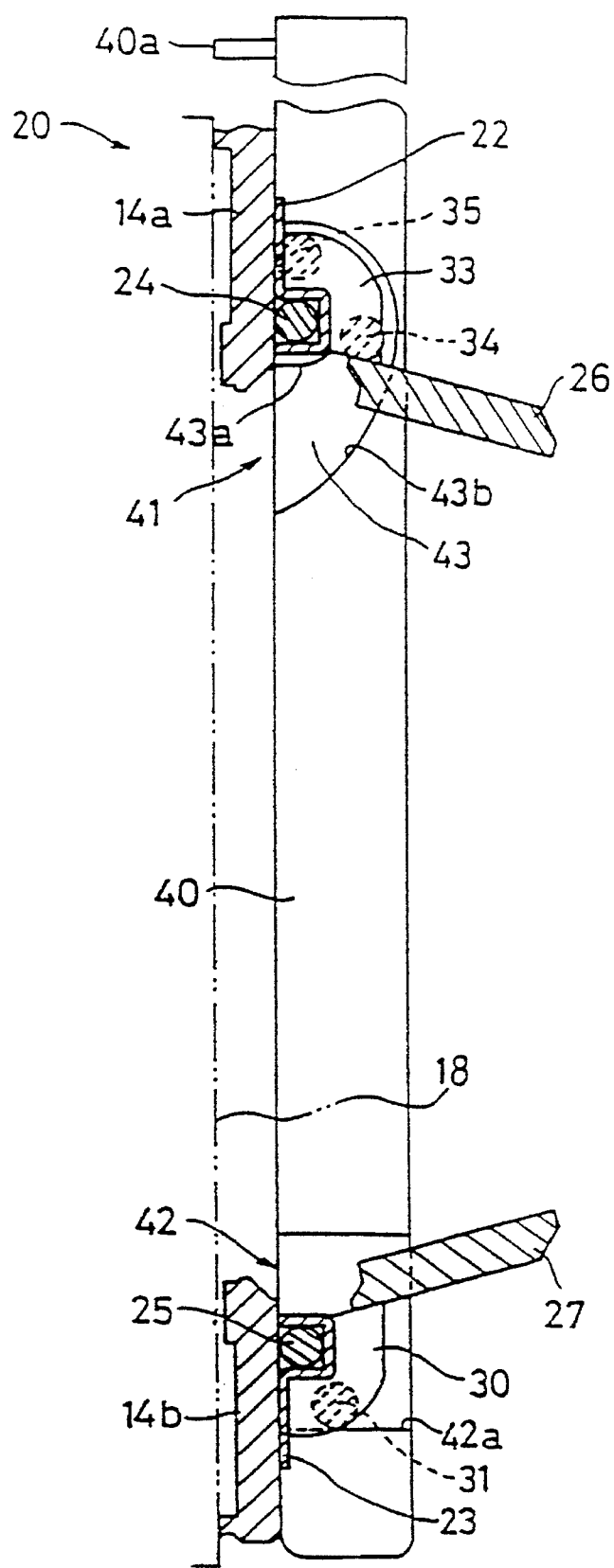
FIG. 1 is a sectional view of an image area size varying mechanism at a standard size position, along the line I—I in FIG. 7.

As shown in FIGS. 7 and 8, torsion springs 28 are wound around the respective shafts 24 and 25, and are engaged at ends 28a thereof with the front surfaces of the bearing members 22 and 23, and at the other ends 28b with the rear surfaces of the first and second light intercepting plates 26 and 27. Consequently, the light intercepting plates 26 and 27 are continuously biased by the respective torsion springs 28 towards an open position in which the light intercepting plates 26 and 27 are retracted from the photographing optical path, as shown in FIGS. 1 and 7.

As shown in FIGS. 7 and 8, the second light intercepting plate 27 is provided on one end thereof (i.e., right end in FIG. 7) with a driven portion 30 integral therewith. The driven portion 30 is in turn provided with an outwardly projecting cam pin 31, which is spaced from and parallel to shaft 25. The first light intercepting plate 26 is provided on one end thereof (i.e., right end in FIG. 7) with a driven portion 33 integral therewith. The driven portion 33 is provided with outwardly projecting first and second cam pins 34 and 35, which are spaced from and parallel to the shaft 24.

Figure 13:
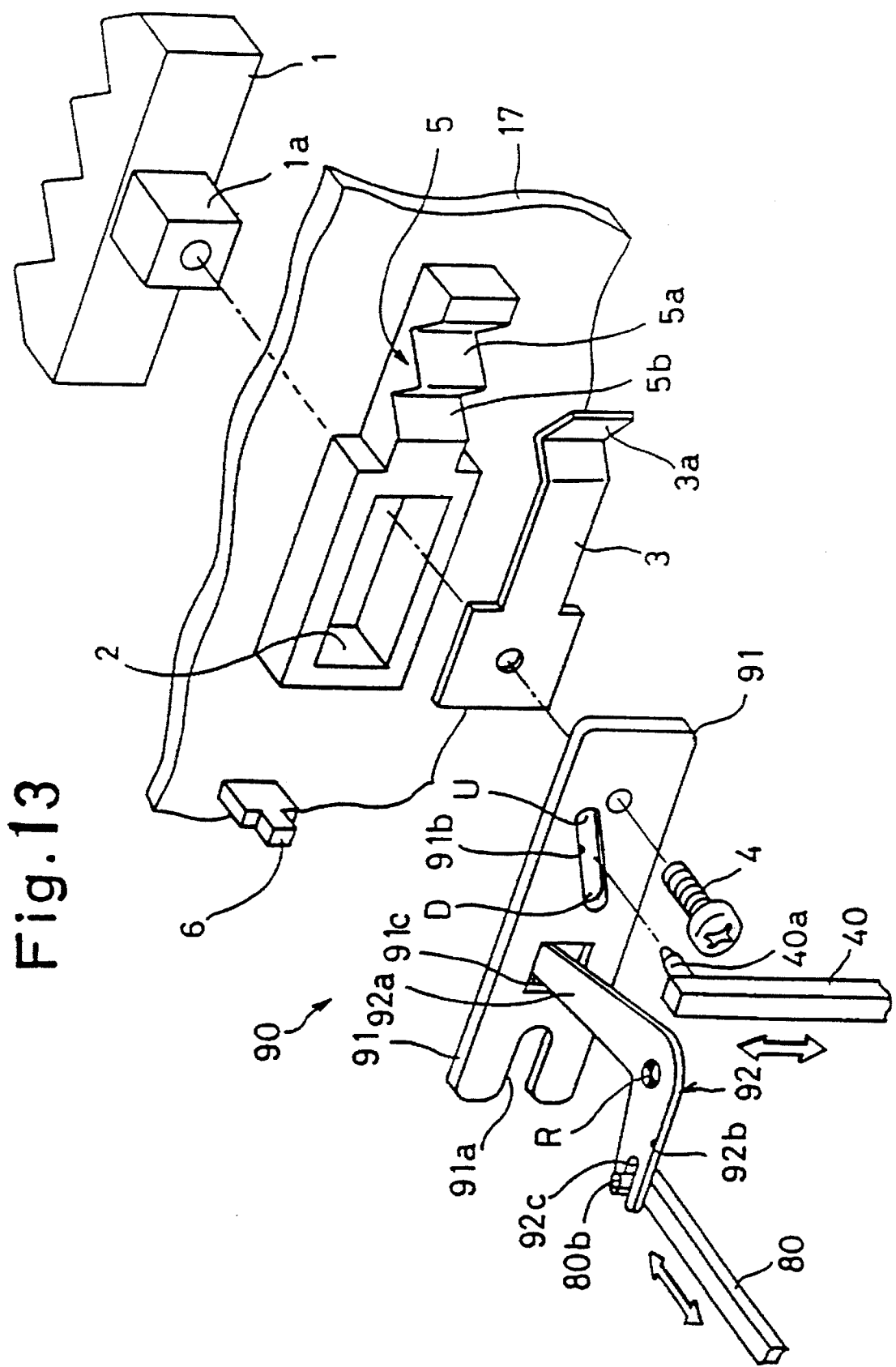
FIG. 13 is an exploded perspective view of a connecting mechanism.

A rod member (i.e., image area size varying rod) 40 is provided on the front surface of the aperture frame 15a (FIG. 14), and is movable in the upward and downward directions. As can be seen in FIG. 13, the rod member 40 is functionally connected to a slidable operating member 1 provided on the rear wall 17 15 of the camera body 11 through a connecting mechanism 90, so that when the slidable operating member 1 is effected, the rod member 40 is moved up and down. The connecting mechanism 90 will be discussed hereinafter.

The rod member 40 is provided, on the surface thereof adjacent to the aperture 16 (FIG. 14), with first (upper) and second (lower) cam portions 41 and 42. The second cam portion 42 is an elongated recess extending in the vertical direction, in which the cam pin 31 is fitted to abut against the end surface 42a thereof. The first cam portion 41 includes a cam groove 43 whose inner peripheral surface is defined by a predetermined curvature of convex cam surface 43a and a predetermined curvature of concave cam surface 43b. The first and second cam pins 34 and 35 are fitted in the cam groove 43, so that the first and second cam pins 34 and 35 abut against the concave cam surface 43b and the convex cam surface 43a, respectively.

The image area size varying mechanism 20 will be discussed below.

Figure 3:
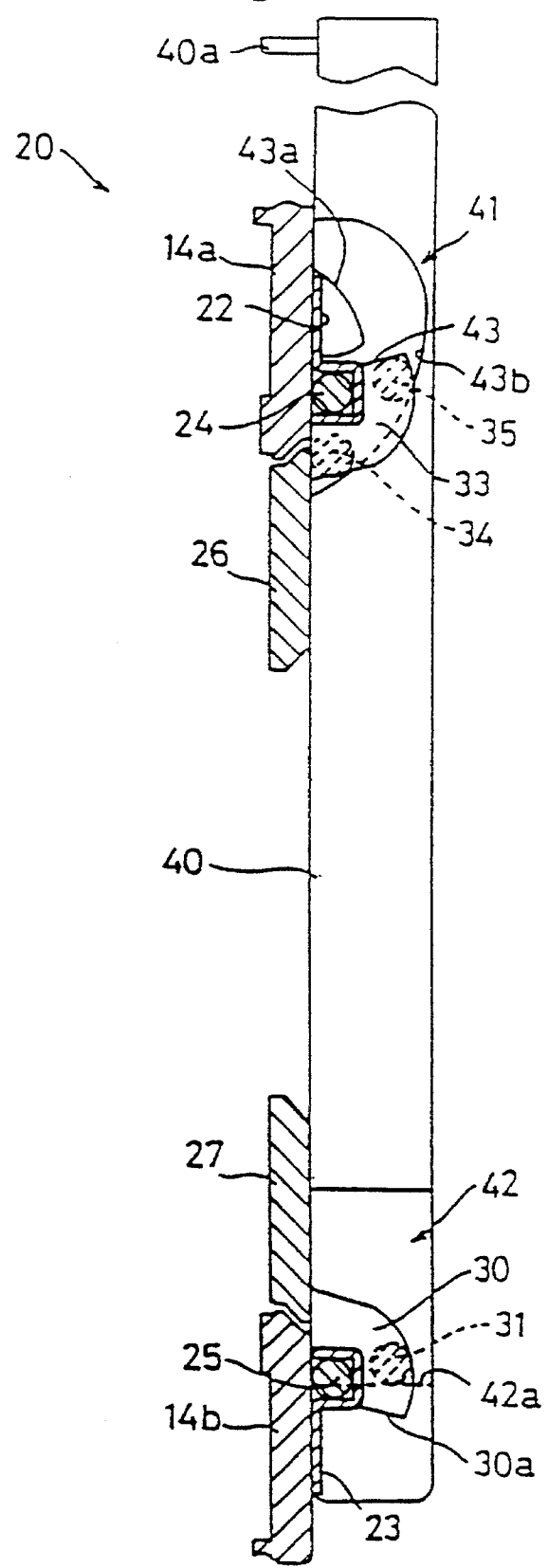
FIG. 3 is a sectional view of a image area size varying mechanism at a panoramic size, along the line III—III in FIG. 8.
Figure 4:
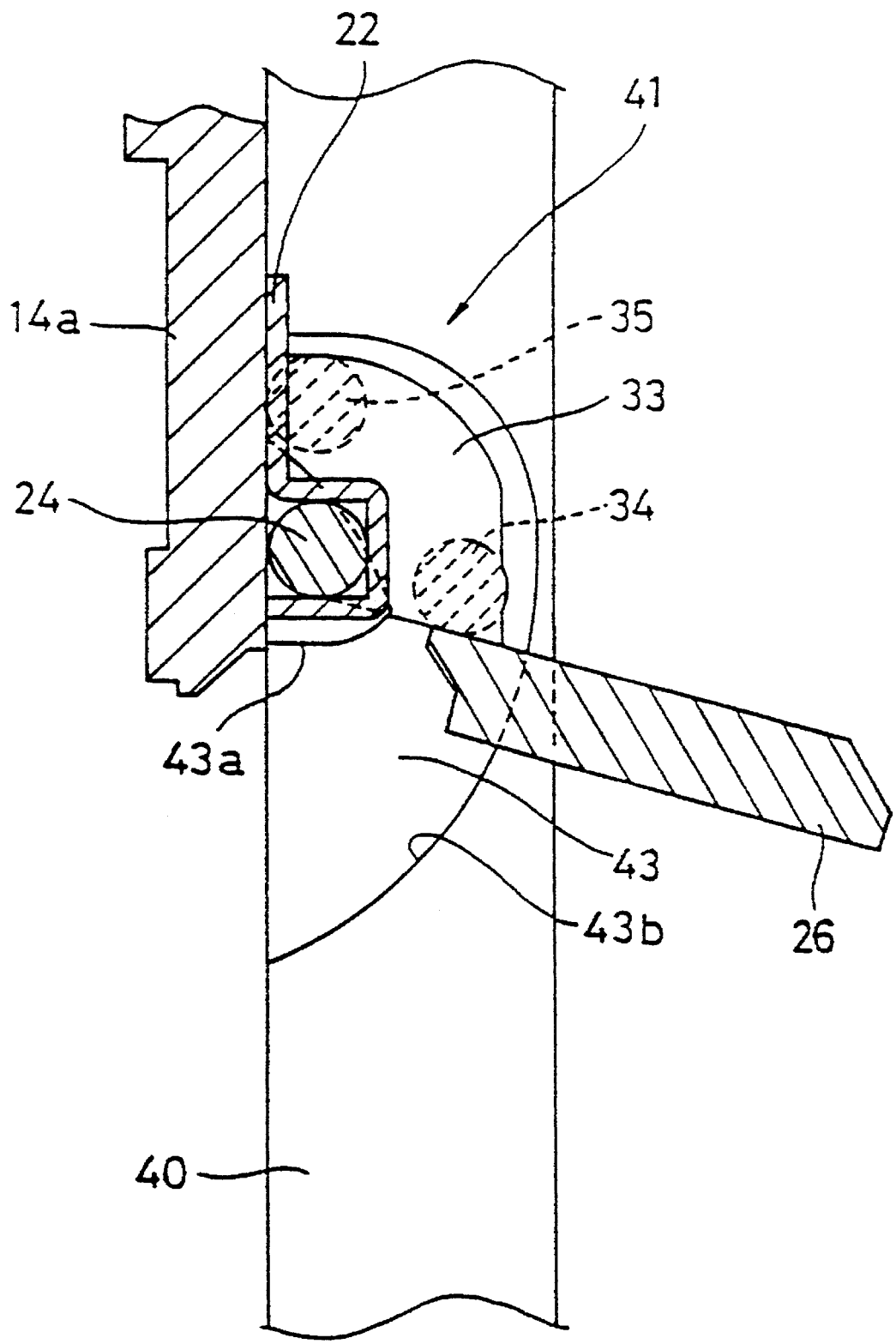
FIG. 4 is an enlarged partial view of FIG. 1.

FIGS. 1, 4 and 7 show the first and second light intercepting plates 26 and 27 located at the standard image area size position (e.g., 36×24 mm), in which the light intercepting plates 26 and 27 are retracted from the photographing optical path. In this state, the rod member 40 is located in the lowermost position with reference to FIG. 13. The second light intercepting plate 27 is held out of the optical path, in which the restricting end surface 30a (see FIGS. 2 and 3) of the driven portion 30 of the second light intercepting plate 27 is brought into contact with the front surface of the aperture frame 14b by the elastic force of the torsion spring 28. The restricting end surface 30a is positioned relative to the second light intercepting plate 27, so that the latter does not come into the photographing optical path when the restricting end surface 30a abuts against the front surface of the aperture frame 14b.

Similar to the second light intercepting plate 27, the first light intercepting plate 26 is held out of the optical path when the restricting end surface 33a of the driven portion 33 of the first light intercepting plate 26 is brought into contact with the front surface of the aperture frame 14b by the elastic force of the torsion spring 28. The restricting end surface 33a is positioned relative to the first light intercepting plate 26, so that the latter does not come into the photographing optical path when the restricting end surface 33a abuts against the front surface of the aperture frame 14b.

Figure 2:
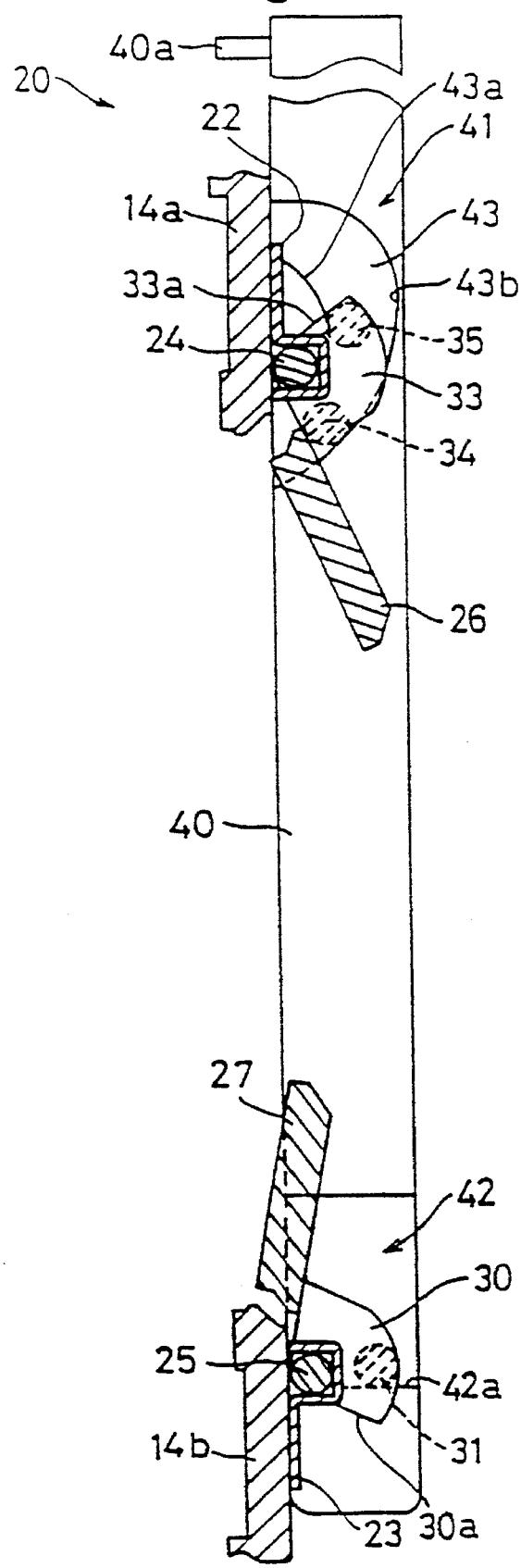
FIG. 2 is a sectional view of an image area size varying mechanism similar to FIG. 1, shown in a position different from FIG. 1.

When the panoramic size image area is selected, the rod member 40 is moved upwards by the sliding movement of the operating member 1, such that the cam pin 31 is pressed by the cam surface 42a and is moved together with the rod member 40. Consequently, the driven portion 30 is rotated in the counterclockwise direction in FIG. 1 about the shaft 25 to move the second light intercepting plate 27 into the photographing optical path. Simultaneously, the inner cam surface 43a which is moved upwards together with the rod member 40, comes into sliding contact with the cam pin 35, imparting clockwise rotation to the latter. Consequently, when the cam pin 35 is moved to a predetermined position, the cam pin 34 comes into sliding contact with the outer cam surface 43b, so that the cam pin 35 is separated from the convex cam surface 43a. As a result, the cam pin 34 is rotated in a clockwise manner by the outer cam surface 43b, thereby moving the first light intercepting plate 26 into the optical path, as shown in FIGS. 2 and 5. In summary, when the rod member 40 is moved to the uppermost position, the panoramic image area size is obtained, as shown in FIGS. 3, 6 and 8. To switch the image area from the panoramic size to the standard size, the rod member 40 is moved downwards to the lower position shown in FIG. 1, as mentioned above.

As can be seen from the foregoing, in the image area size varying mechanism 20 as constructed above, the movement of the upper and lower (i.e., first and second) light intercepting plates 26 and 27 into and out of the optical path is easily carried out by the movement of the rod member 40 in the vertical directions (i.e., up and down directions).

Although the light intercepting plates 26 and 27 are secured to the respective shafts 24 and 25 in the illustrated embodiment, it is possible to form the light intercepting plates 26 and 27 and the respective shafts 24 and 25 as an integral structure. Furthermore, it is possible to provide two shafts which project outwards in opposite directions from each light intercepting plate 26 or 27, so that each of the light intercepting plates 26 and 27 is rotatably supported by the two shafts. Furthermore, it is possible to rotatably connect the light intercepting plates to the aperture frames by elastic hinges rather than the disclosed shafts.

Figure 9:
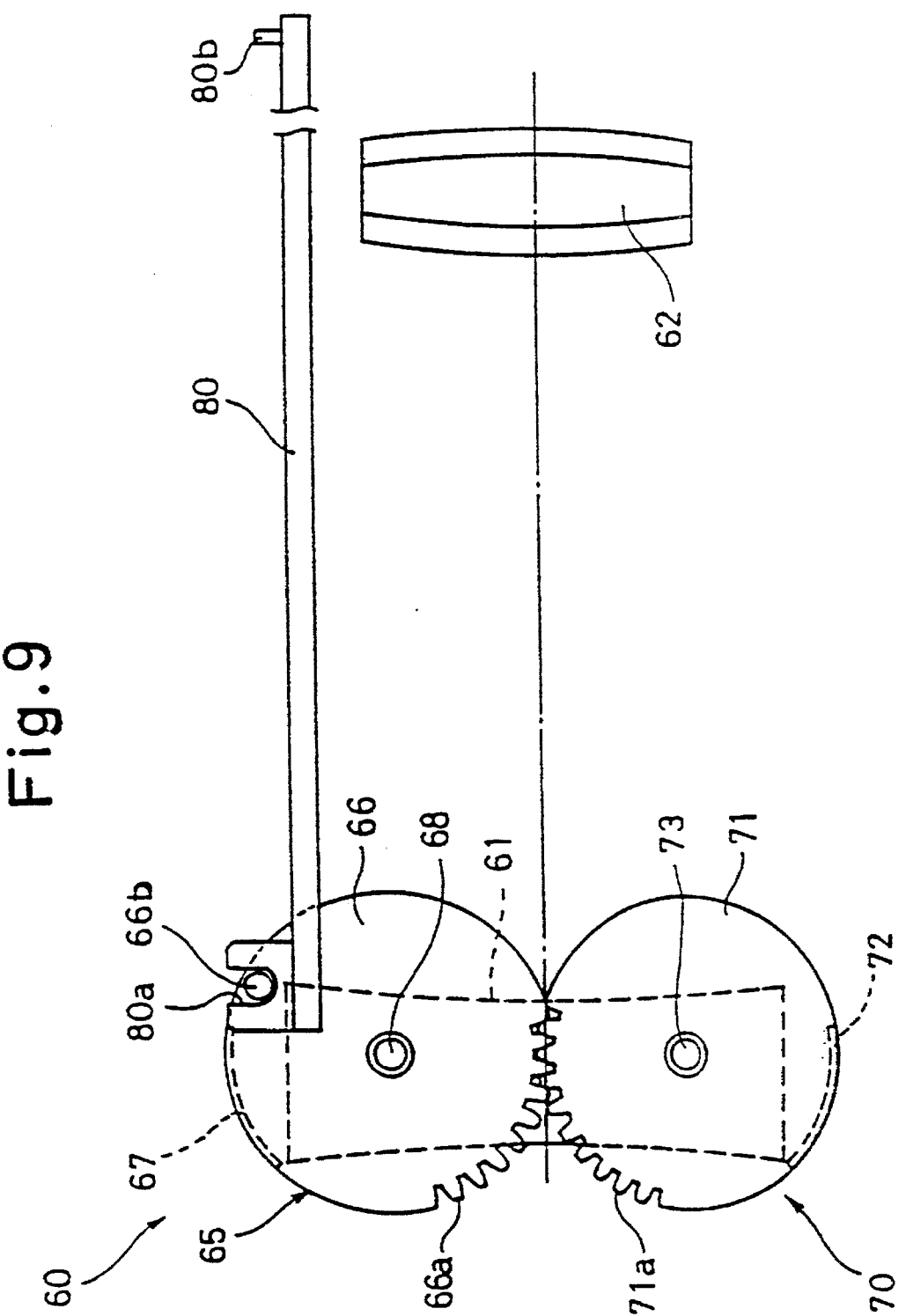
FIG. 9 is a side elevational view of a finder field size varying mechanism.
Figure 10:
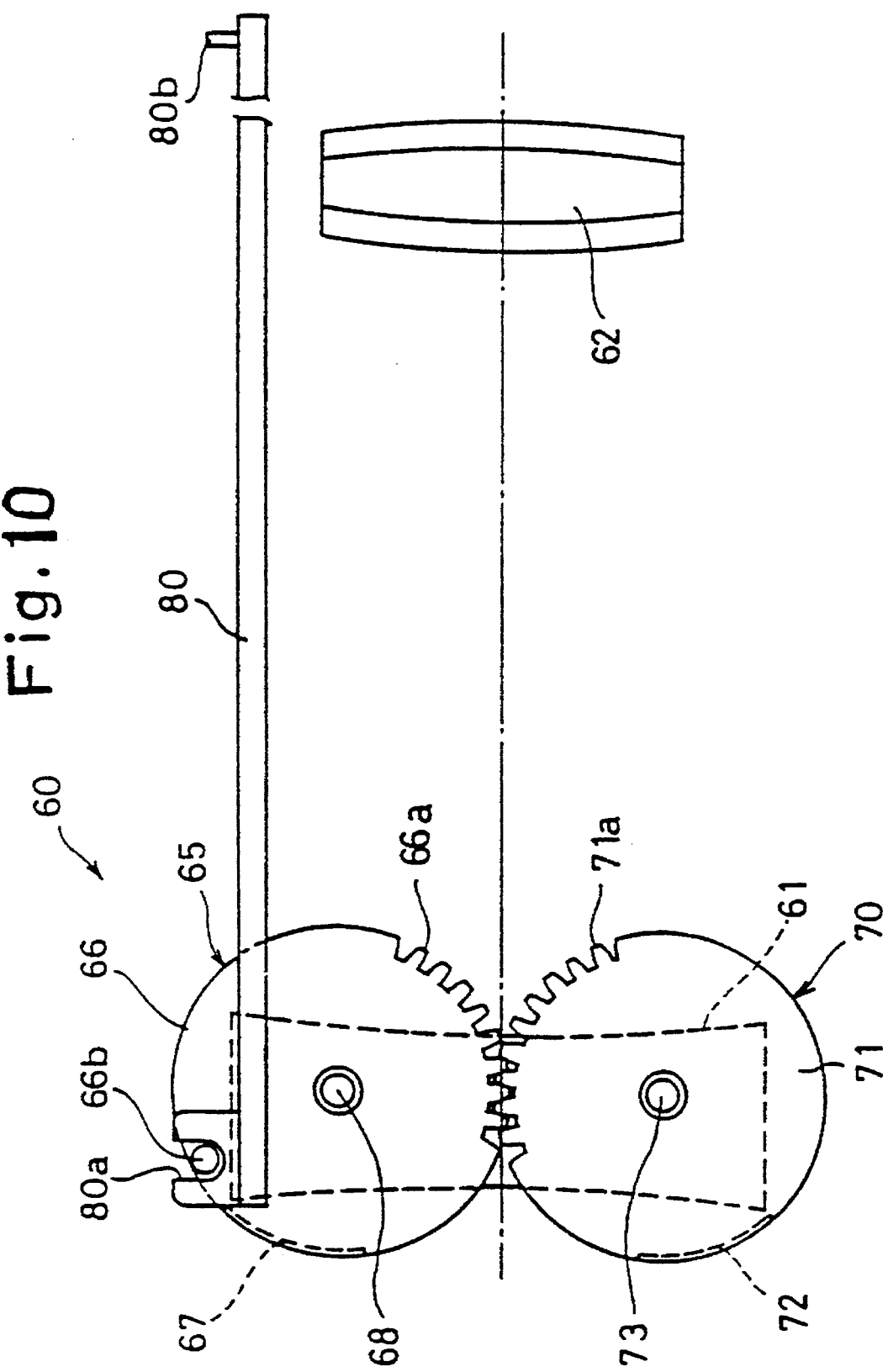
FIG. 10 is a sectional view of a finder field size varying mechanism similar to FIG. 9, shown in a position different from FIG. 9.
Figure 11:
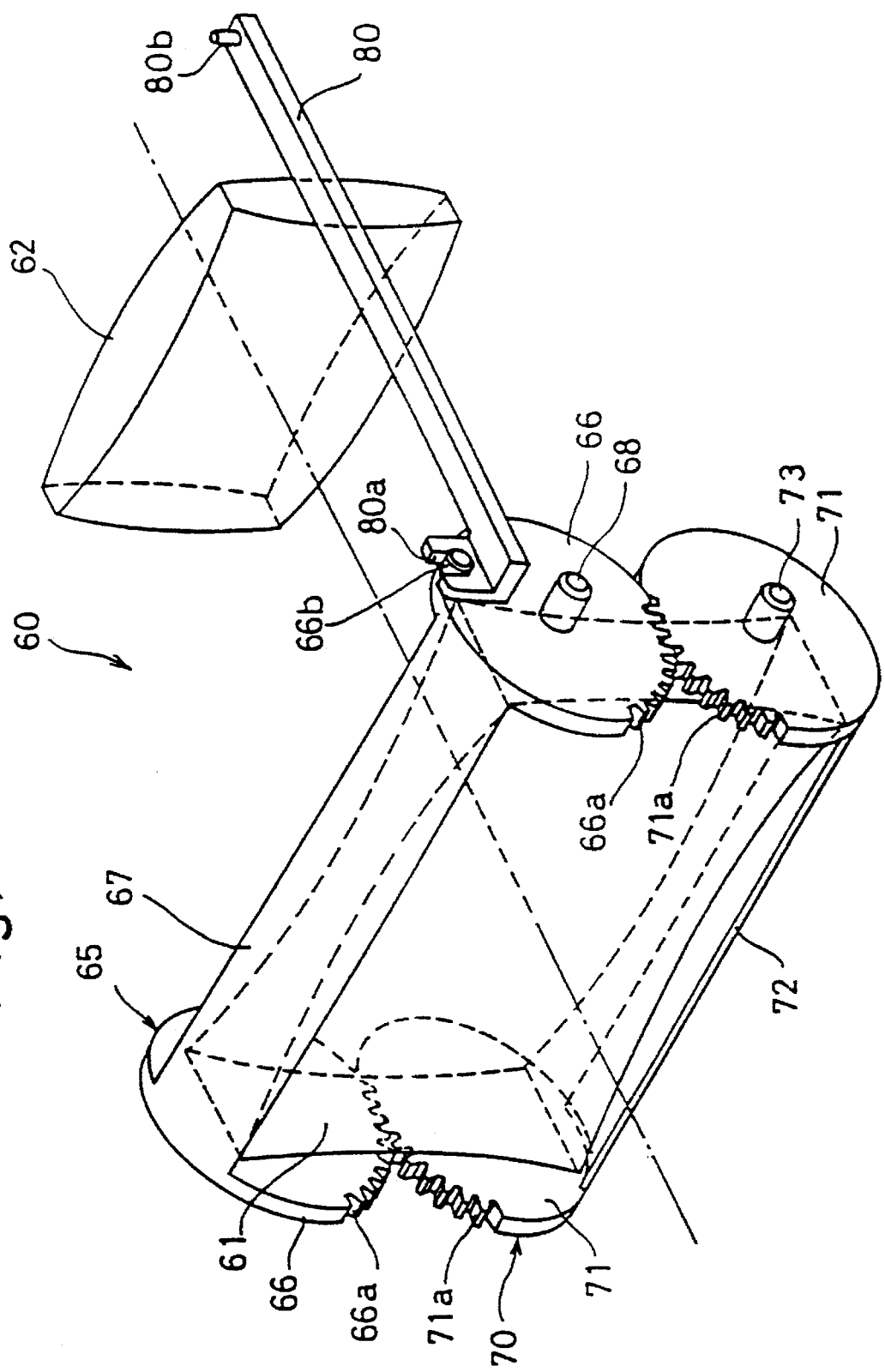
FIG. 11 is a perspective view of a finder field size varying mechanism shown in FIG. 9.
Figure 12:
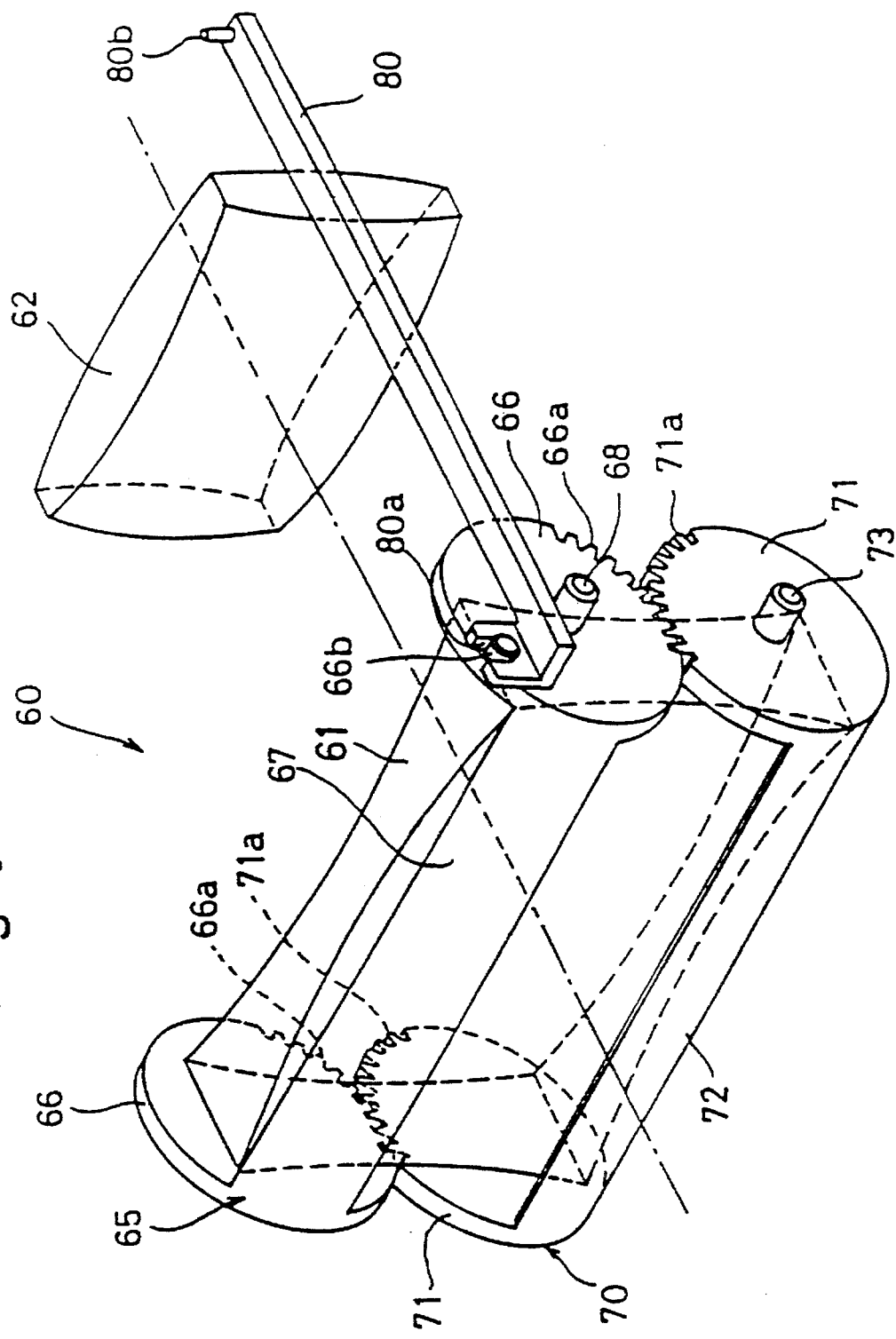
FIG. 12 is a perspective view of a finder field size varying mechanism shown in FIG. 10.

The camera 10 according to the present invention has a field varying mechanism 60 which varies the size of the field of view of the finder in association with a variation in the size of the image area between the standard size and the panoramic size. The field varying mechanism 60 is shown in FIGS. 9 through 12. FIGS. 9 and 11 show the field varying mechanism 60 when the standard size image area is selected, and FIGS. 10 and 12 show the field varying mechanism 60 when the panoramic size image area is selected, respectively.

The camera 10 has an inverted Galilean finder including an objective lens 61 and an eyepiece 62 in the illustrated embodiment. The field varying mechanism 60 includes light intercepting plates which are retractably moved into the optical path in front of the objective lens 61 to vary the size of the field of view of the finder. Namely, the field varying mechanism 60 is essentially comprised of a pair of upper and lower light intercepting members (i.e., rotors) 65 and 70 and an arm member 80 which is engaged by the light intercepting member 65. The upper light intercepting member 65 includes a pair of right and left identical circular plates (i.e., discs) 66 which are symmetrically provided on the outer peripheral surfaces thereof with sector gears 66a having a predetermined number of teeth. The upper light intercepting member 65 further includes a light intercepting plate 67 which connects the circular plates 66. The circular discs 66 are supported by a stationary portion (not shown) to rotate about a shaft or shafts 68.

The lower light intercepting member 70 includes a pair of identical left and right circular plates (i.e., discs) 71 which are symmetrically provided on the outer peripheral surfaces thereof with sector gears 71a having a predetermined number of teeth. The lower light intercepting member 70 includes a light intercepting plate 72 which connects the circular plates 71. The circular discs 71 are supported by a stationary portion (not shown) so as to rotate about a shaft or shafts 73. The light intercepting plate 72 is located on the opposite side of the light intercepting plate 67 with respect to the objective lens 61. The sector gears 66a of the circular discs 66 are in mesh with the sector gears 71a of the corresponding circular discs 71, so that the rotation of the circular discs 66 or the circular discs 71 is transmitted to the other of the circular discs 71 or 66, respectively.

One of the circular discs 66 of the upper light intercepting member 65 is integrally provided with an outwardly projecting engaging pin 66b which is radially spaced from the shaft 68 at a predetermined distance. The arm member 80 is supported to move in the forward and backward directions of the camera 10 through the connecting mechanism 90 that is associated with the operating member 1. The arm member 80 is provided with a generally U-shaped engaging groove 80a in which the engaging pin 66b is fitted. The engaging pin 66b is slidable within the engaging groove 80a. Namely, when the arm member 80 is moved in the forward and backward directions, the light intercepting member 65 rotates. The rotation of the light intercepting member 65 causes the light intercepting member 70 to rotate through the sector gears 66a and 71a.

The finder field varying mechanism 60 as constructed above operates as follows:

When an image area of standard size is selected, as shown in FIGS. 9 and 11, the light intercepting plates 67 and 72 of the light intercepting members 65 and 70 are located in a retracted position and are outside of the optical path of the objective lens 61. When the image area is switched from the standard size to the panoramic size, the operating member 1 is slid to drive the connecting mechanism 90 and thereby move the arm member 80 forward.

Consequently, the light intercepting member 65 is rotated to move the light intercepting plate 67 into the optical path of the objective lens 61 on the object side of the latter. The light intercepting member 70 is rotated in the direction opposite to the rotation of the light intercepting member 65 through the engagement of the sector gears 66a and 71a to move the light intercepting plate 72 into the optical path of the objective lens 61 on the object side of the latter. As a result, the light intercepting plates 67 and 72 are positioned in front of the objective lens 61 to intercept light at predetermined upper and lower portions of the field of view of the finder. Thus, the size of the field of view is reduced to correspond to the panoramic size image area. To switch the reduced field size to the full size corresponding to the standard image area size, the arm member 80 is moved to the rearmost position, as shown in FIG. 9 or 11.

In the field size varying mechanism 60 in the illustrated embodiment, the gears (i.e., sector gears 66a and 71a) are provided directly on the light intercepting plates 67 and 72 for restricting the field of view of the finder. Accordingly, a complex mechanism is not necessary to associate the light intercepting plates 67 and 72. In the present invention, only one of the light intercepting plates is driven which, in turn, moves the other light intercepting plate.

FIG. 13 shows the connecting mechanism 90 which functionally connects the image area varying mechanism 20 and the field size varying mechanism 60. The operating member 1, provided on the upper end of the rear wall 17 of the camera 10, is a sliding switch having left and right click-stop portions. The sliding switch 1 is provided on the front surface thereof with a projection 1a integral therewith, which is inserted in a laterally elongated opening 2 formed in the rear wall 17. The projection 1a is secured at the front end thereof to a cam plate 91 through an elastically deformable click-plate 3 by a screw 4 from the front side of the opening 2, i.e., from the inside of the camera 10, so as to slide in the lateral direction on the rear wall 17.

The rear wall 17 is provided, on the front surface thereof, with a click-groove portion 5 which has two recesses 5a and 5b next to each other and adjacent to the opening 2. The engaging projection 3a of the click-plate 3 is selectively engaged in the recesses 5a and 5b when the sliding switch 1 is slid in the lateral direction. Consequently, the sliding switch 1 can be clicked into either of the two recesses 5a and 5b.

The cam plate 91, which is secured to the front surface of the click-plate 3, is provided on one lateral end thereof with a rail portion (i.e., guide groove) 91a. An engaging projection 6, which is provided on the front surface of the rear wall 17 is engaged in the rail portion 91a. The rail portion 91a and engaging projection 6 arrangement allows for the lateral movement of the sliding switch (i.e., operating member) 1. The cam plate 91 is also provided with an oblique cam groove 91b which extends from the lower left portion to the upper right portion as viewed from the object side. The rod member 40 of the image area varying mechanism 20 is provided at the upper end thereof with a cam pin 40a which is fitted in the cam groove 91b.

Also, the cam plate 91 has a hole 91c in which a first arm portion 92a of a generally L-shaped movement converting member 92 is inserted. The movement converting member 92 also has a second arm portion 92b which is substantially orthogonal to the first arm portion 92a. The movement converting member 92 is pivoted with respect to the camera body through a pivot shaft R which is located at the intersecting point of the first and second arm portions 92a and 92b. The second arm portion 92b is provided on the front end thereof with an engaging groove 92c in which an engaging pin 80b, formed on the rear end of the arm portion 80 of the field size varying mechanism 60, is slidably fitted.

With the connecting mechanism 90 as constructed above, when the sliding switch 1 is in the left position, as viewed from the rear side of the camera 10, the engaging projection 3a of the click plate 3 is engaged in the recess 5a, and the rod member 40 of the image area varying mechanism 20 is located at the lowermost position. Accordingly, the cam pin 40a of the rod member 40 is located at the lower left position D (FIG. 13) within the cam groove 91b. Consequently, the standard size image area is selected, as shown in FIGS. 1 and 7. On the other hand, with respect to the field size varying mechanism 60, the arm portion 80 is located at the rearmost position. Accordingly, the size of the field of view of the finder corresponds to the standard size image area, as shown in FIGS. 9 and 11.

When the operating member (i.e., sliding switch) 1 is moved to the right position as viewed from the rear side of the camera 10, the engaging projection 3a of the click-plate 3 is engaged in the recess 5b. Since the cam plate 91 is moved together with the sliding switch 1, the cam pin 40a of the rod member 40 is moved to the upper right position U (FIG. 13) within the cam groove 91b. Consequently, the image area is switched to the panoramic size, as shown in FIGS. 3 and 8. Simultaneously, in the field size varying mechanism 60, the movement converting member 92 is rotated about the pivot shaft R in the counterclockwise direction, as viewed from above, in accordance with the movement of the cam plate 91. As a result, the arm portion 80 is moved forward, and the field of view of the finder is switched to a size corresponding to the panoramic size image area, as shown in FIGS. 10 and 12.

To switch the image area size back to the standard size, and the field of view size to a size that corresponds to the standard image area, by the image area varying mechanism 20 and the field size varying mechanism 60, respectively, the sliding switch 1 is slid to the leftmost position again.

As can be understood from the above discussion, according to the present invention, a small camera having a simple mechanism for varying the size of the image area and/or a simple mechanism for varying the size of the field of view

We claim:

1. A camera having a mechanism for varying a picture image, comprising:

an aperture frame which defines an aperture corresponding to said picture image area;

a pair of light intercepting plates which are rotatably supported by respective shafts on opposite sides of said aperture and which move between an operative position, in which said pair of light intercepting plates partially cover said aperture, and a retracted position, in which said pair of light intercepting plates are retracted from said aperture, said operative position corresponding to a small image area, and said retracted position corresponding to a large image area, one of said pair of light intercepting plates comprising a cam pin and the other of said pair of light intercepting plates comprising first and second cam pins;

an associating rod member which engages said shafts of said pair of light intercepting plates and which translates linearly in a direction substantially perpendicular to said shafts, said associating rod member comprising means for moving, positioning and securely holding said pair of light intercepting plates in a position by a single linear movement, said associating rod member comprising a pair of cam portions, one of said cam portions having a continuous single cam surface with which said cam pin of said one of said pair of light intercepting plates engages, and the other cam portion having two separate cam surfaces with which said first and second cam pins of said other one of said pair of light intercepting plates respectively engage at different angular positions of said other one of said pair of light intercepting plates; and an actuating member which rotates said pair of light intercepting plates in association with movement of said associating rod member.

2. The camera of claim 1, wherein said pair of intercepting plates are rotatable between said operative position and said retracted position.

3. The camera of claim 1, wherein said shafts of said pair of light intercepting plates extend in a direction parallel to opposite sides of said aperture and are rotatably supported by said aperture frame.

4. The camera of claim 1, further comprising:

elastic biasing members that continuously bias said pair light intercepting plates towards said retracted position.

5. The camera of claim 1, further comprising:

a view finder having a pair of rotors provided on an outside of a generally rectangular field of view and which have rotating shafts substantially parallel to opposite parallel sides of said field of view;

a rotating mechanism which rotates said pair of rotors in an associative manner; and light intercepting plates provided on said pair of rotors and which are movable between a small field size position, in which said pair of light intercepting plates partly cover said field of view, and a large field size position, in which said pair of light intercepting plates are retracted from said field of view.

6. The camera of claim 1, further comprising:

a view finder having a pair of rotors rotatable about respective axes parallel to opposite sides of a generally rectangular field of view of said view finder and provided on an outside of said field of view;

a rotating mechanism which rotates said pair of rotors in an associative manner;

light intercepting plates integrally provided on said pair of rotors and movable between a small field size position, in which said light intercepting plates partly cover said field of view, and a large field size position, in which said light intercepting plates are retracted from said field of view, in accordance with a rotation of said pair of rotors; and driving means for rotating one of said pair of rotors.

7. The camera of claim 1, each of said pair of light intercepting plates comprising a cam pin, each of said cam pin of said pair of light intercepting plates being in continuous contact with a cam surface of said associating rod member.

8. The camera according to claim 1, said associating rod member directly engages said shafts of said pair of light intercepting plates.

9. The camera of claim 1, further comprising:

an operating member provided on an external portion of said camera slidable to vary a size of said picture image area, and an associating means for moving said associating rod member in association with a sliding movement of said operating member.

10. The camera of claim 9, wherein said associating rod member extends in a vertical direction with respect to said camera body and is supported to linearly move in said vertical direction.

11. The camera of claim 9, wherein said operating member is provided on said back surface of said camera body and is movable in a horizontal direction with respect to said camera body.

12. The camera of claim 1, wherein one of said two separate cam surfaces comprises a convex cam surface and the other comprises a concave cam surface.

13. The camera of claim 12, wherein, when said pair of light intercepting plates are moved from said retracted position to said operative position, said cam pin engages with said convex cam surface and rotates to move said pair of light intercepting plates towards said operative position while said second pin is initially disengaged from said concave cam surface, and wherein, when said pair of light intercepting plates are rotated through a predetermined angle, said first cam pin is disengaged from said convex cam surface and said second cam pin engages with said concave cam surface until said pair of light intercepting plates are rotated into said operative position.

14. The camera of claim 13, wherein said one cam pin is continuously in contact with a cam surface of said associating rod member that extends in a direction substantially perpendicular to a movement of said associating rod member.

15. The camera of claim 8, wherein, when said pair of light intercepting plates are in said operative position, the concave cam surface engages with the second cam pin to hold said pair of light intercepting plates in said operative position against said elastic biasing members.

16. The camera of claim 15, wherein, when said pair of light intercepting plates are moved from said operative position to said retracted position, said second cam pin rotates to move said pair of light intercepting plates towards said retracted position while engaging with said concave cam surface through the force of said elastic biasing members, and wherein, when said pair of light intercepting plates are rotated through a predetermined angle, said second cam pin disengages from said concave cam surface and said first cam pin engages with said convex cam surface until said pair of light intercepting plates are rotated into said retracted position.

17. The camera of claim 15, wherein said associating rod member is provided with a groove which defines said convex cam surface and said concave cam surface.

* * * * *